United States Patent [19]

Schmitt

[11] 4,150,754

[45] Apr. 24, 1979

[54] UTILITY CRANE

[75] Inventor: Marvin G. Schmitt, Fountain Valley, Calif.

[73] Assignee: AMI Industries, Inc., Downey, Calif.

[21] Appl. No.: 799,223

[22] Filed: May 23, 1977

[51] Int. Cl.² .......................... B60P 1/00; B60P 3/12

[52] U.S. Cl. .......................... 212/8 R; 414/680

[58] Field of Search .......... 214/1 D, 370, 371, 372, 214/373, 374, 390, 392, 394, 396, 138 A; 280/43.14, 43.24; 212/8 R, 59 R, 46 A

[56] References Cited

U.S. PATENT DOCUMENTS

| | | | |
|---|---|---|---|
| 3,570,153 | 3/1971 | Guinot | 214/138 R |
| 3,788,675 | 1/1974 | Wilander | 214/390 |
| 3,794,296 | 2/1974 | Hasstedt | 212/66 |

FOREIGN PATENT DOCUMENTS

| | | | |
|---|---|---|---|
| 809094 | 3/1951 | Fed. Rep. of Germany | 212/46 A |
| 1040214 | 10/1958 | Fed. Rep. of Germany | 212/46 A |
| 165756 | 12/1958 | Switzerland | 212/46 A |
| 1116946 | 6/1968 | United Kingdom | 214/390 |

*Primary Examiner*—Lawrence J. Oresky
*Attorney, Agent, or Firm*—McNenny, Pearne, Gordon, Gail, Dickinson & Schiller

[57] ABSTRACT

A trailerable utility crane having a compound articulated mast to provide variable working configurations and foldable on itself to provide a relatively compact storage configuration as well as an extended length sufficient to load and unload a tow vehicle. Transport wheels for road travel are carried by the mast in a manner that allows the base of the crane to be lowered to the ground automatically with extension of the mast. The mast is supported for azimuthal movement on the base and outriggers for stabilizing the base are safety-interlocked with the azimuthal support.

18 Claims, 9 Drawing Figures

FIG. 6
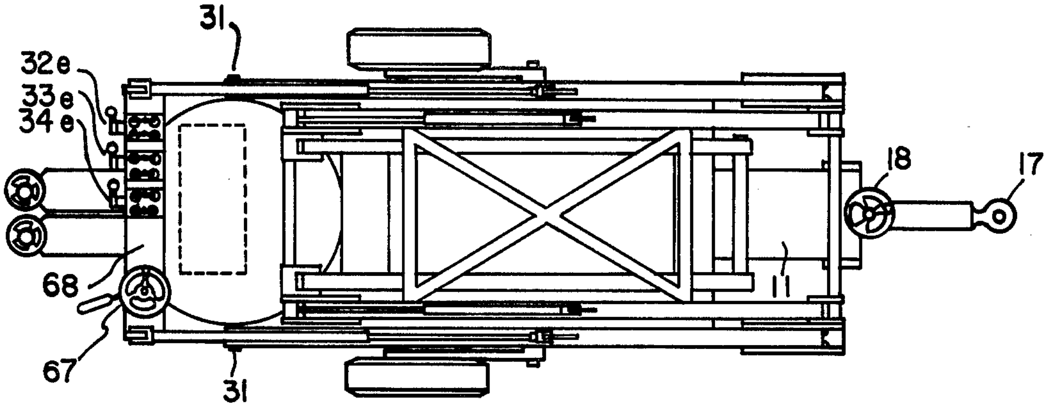
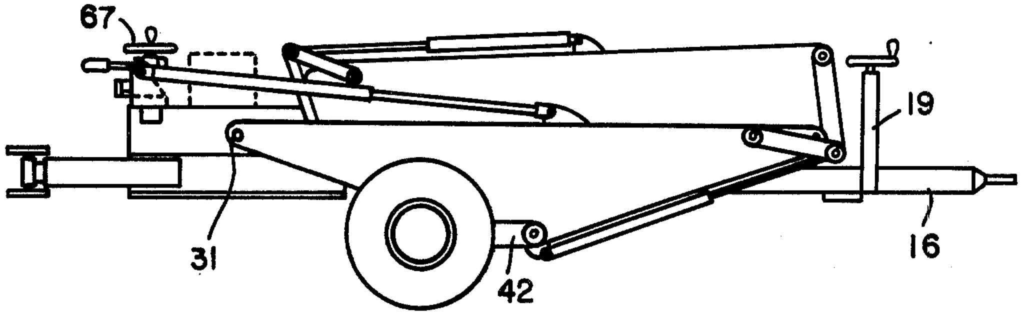
FIG. 7
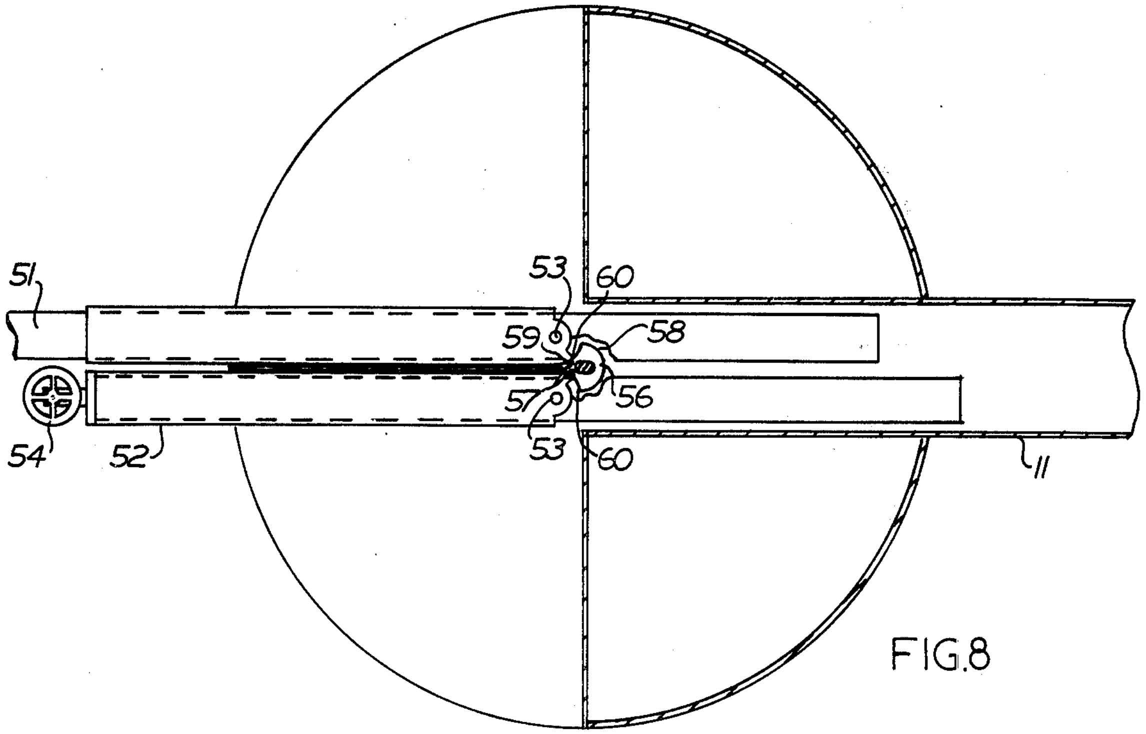
FIG. 8

UTILITY CRANE

BACKGROUND OF THE INVENTION

The invention relates to lifting apparatus, and in particular to a mobile utility crane.

PRIOR ART

The invention is directed to apparatus for satisfying the need for equipment having a capacity beyond that of trailerable carts and dollies presently used, e.g., in automotive servicing and special purpose auxiliary truck-mounted boom hoists. The invention thereby offers a practical and economically sound alternative to the acquisition or rental of a selfpropelled crane having a capacity ordinarily beyond that required in certain fields, such as industrial and commercial construction and maintenance in which the invention has application.

SUMMARY OF THE INVENTION

The invention provides a mobile crane having several features which provide relatively large extension capacity and operational flexibility and which make it ideally suited for transport as a trailer between work sites. The crane includes an articulated compound mast which folds into a compact, low profile configuration for transport and storage, and which extends into a relatively long unit for vertical or horizontal reach, or combinations of both. A low profile and relatively short length are achieved by arranging various individual beam sections of the mast to fold upon one another through angles of approximately 180 degrees.

In accordance with an important feature of the invention, a set of transport wheels of the crane are carried on the mast. As a result, upon initial raising movement of the mast, the frame on which the mast operates is automatically lowered from an elevated road clearance posture to a low-level stance for stabilization. Actuators and related controls for operating the mast are thereby adapted to provide the additional function of the raising and lowering of the frame.

The mast is elevated by movement about a horizontal pivot axis at its base, while the pivot axis is carried on a turntable for azimuthal movement through a full 360 degrees. The mast is stabilized by a pair of outriggers retractably carried on the frame and interlocked to the turntable such that the turntable cannot be moved from a rest orientation where the center of gravity of the mast overlies the frame unless the outriggers are deployed by lateral extension from the frame. Similarly, the interlock between the turntable and the outriggers prevents the latter from being retracted when the mast is out of its rest orientation.

BRIEF DESCRIPTION OF THE DRAWINGS

FIG. 6 is a relatively detailed plan view of the crane in its retracted position;

FIG. 7 is an elevational view corresponding to the view of FIG. 6;

FIG. 8 is an enlarged view, partially in section, illustrating details of a pair of outriggers and elements of a turntable.

DESCRIPTION OF THE PREFERRED EMBODIMENT

Figure 2:
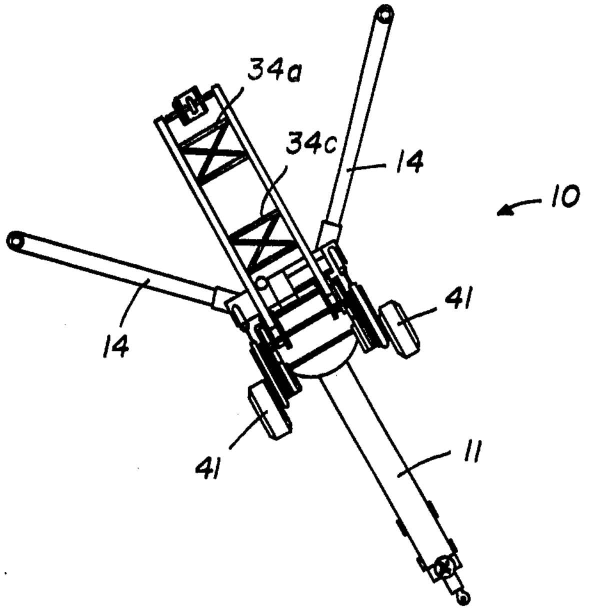
FIG. 2 is a plan view of the crane of FIG. 1.
Figure 1:
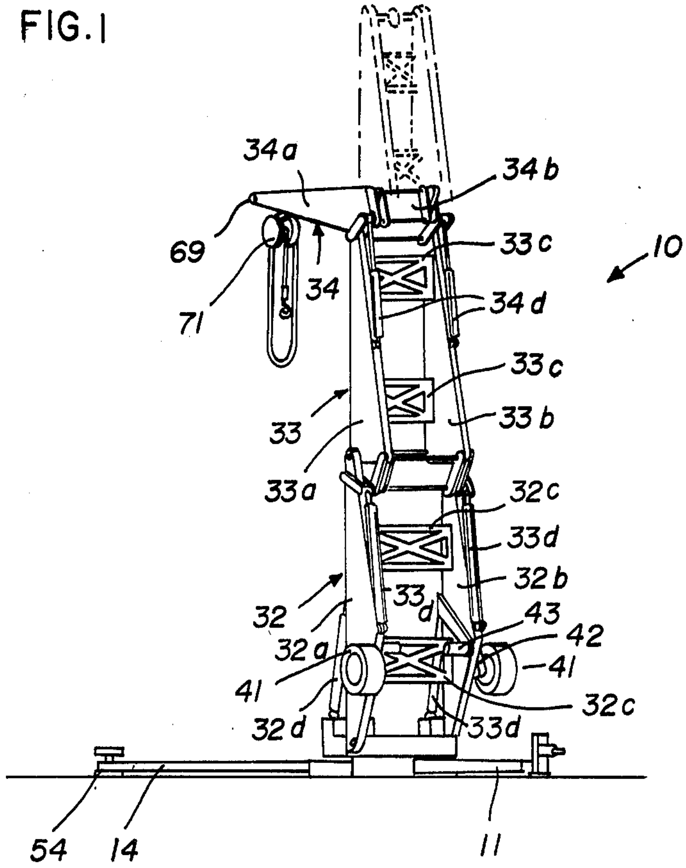
FIG. 1 is a perspective view of a mobile utility crane constructed in accordance with the principles of the invention.

Referring now to the drawings, and in particular to FIGS. 1 and 2, there is illustrated a mobile crane 10 principally comprising a tongue frame or base 11, a turntable assembly 12, a mast 13, and stabilizing outriggers 14, all fabricated primarily of steel.

Figure 9:
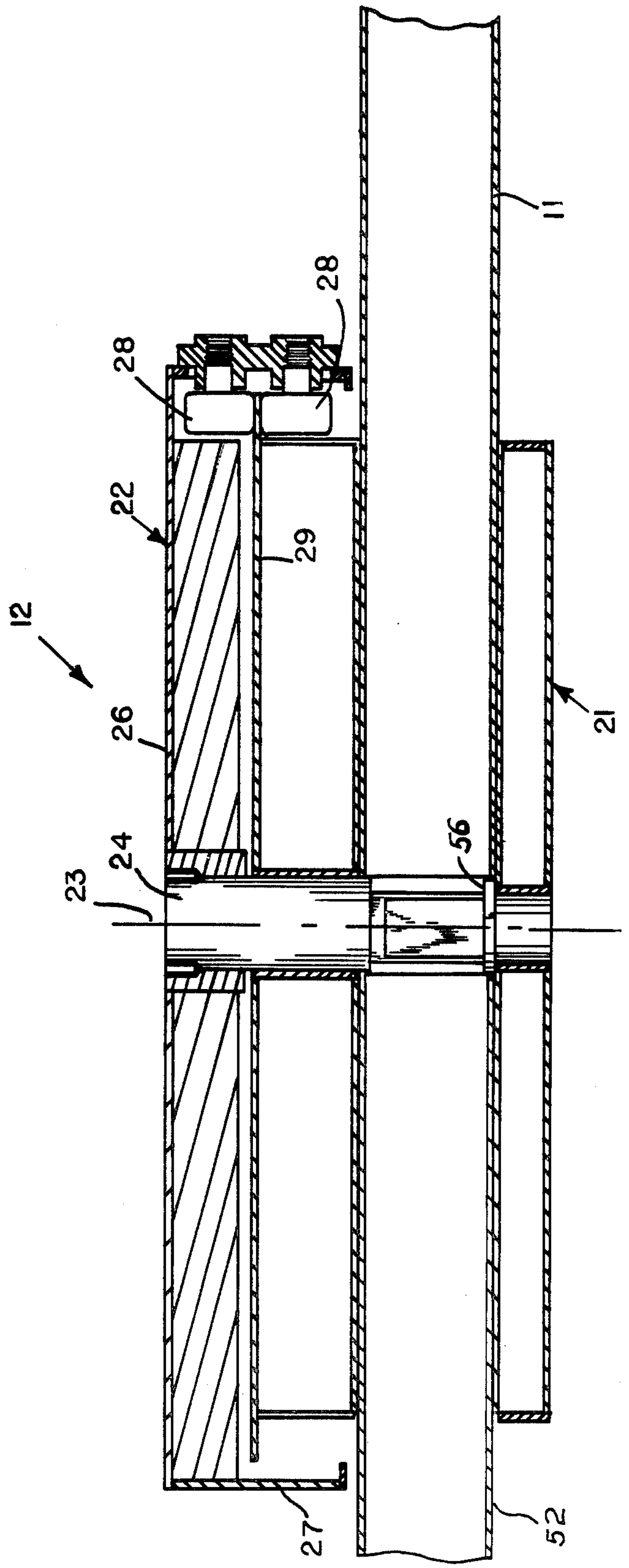
FIG. 9 is a cross sectional view of the turntable supporting the mast for azimuthal movement.

The illustrated tongue frame 11 is an elongated beam of rectangular, hollow cross section. At a forward end, it has an extension 16, including coupling means in the form of an eyelet hitch 17. The extension 16 is vertically adjustable relative to the main body of the tongue frame 11 by rotation of an adjacent hand wheel 18 operating on a nut (not shown) carried on the extension within a tower 19 in a known manner. With reference to FIG. 9, a rearward end of the tongue frame is received in and suitably welded to the turntable assembly 12.

The turntable assembly 12 comprises a pair of generally circular weldments in the form of a fixed base 21 and a table 22. The table 22 is supported on the base 21 for rotation about a central vertical axis 23 defined by a king pin 24 fixed to the table and rotatable in the base. The table 22 includes a circular plate 26 forming its upper face and a depending, cylindrical skirt 27. Three sets of rollers 28 (only one set is seen in the section of FIG. 9) are circumferentially spaced on the skirt 27 at 120-degree intervals to vertically support the table 22 by engagement with opposed surfaces on the edge area of a circular plate 29 on the upper side of the base 21.

Figure 5:
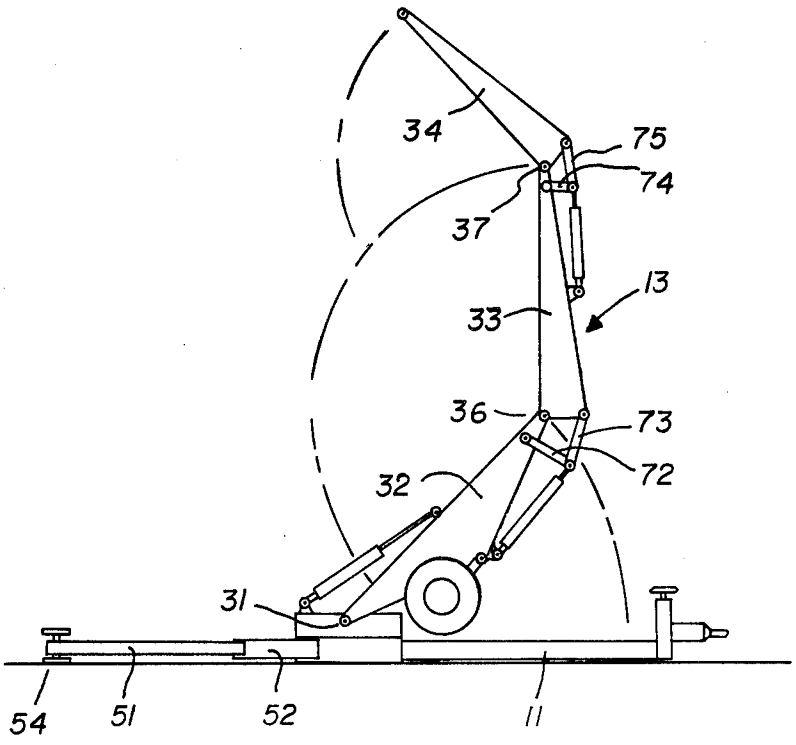
FIG. 5 is a side view of the crane in still later sequence, with its mast in an extended position.

The mast 13 is pivotal at its base relative to the turntable 22 on trunnion mounts 31 (FIGS. 6 and 7) defining a horizontal axis. The mast 13 comprises a plurality of articulated beams, including a first stage 32 mounted by these trunnions 31 on the table 22. Successive beam stages 33 and 34 are linked together at parallel pivot points or axes 36 and 37 (FIG. 5). Each beam 32 to 34 is of ladder-type construction, with parallel side pieces 32*a, b;* 33*a, b;* and 34*a, b* (FIG. 1). Crosspieces 32*c,* 33*c,* and 34*c* rigidly connect associated side pieces. The second and third beams 33 and 34 are each somewhat narrower than their preceding beams 32 and 33, respectively, so that the associated side pieces are adapted to nest into the side pieces of the preceding beam. Each beam of the mast 13 is separately manipulated by means of power actuators 32*d,* 33*d,* and 34*d.* Mounted on the first or primary beam 32 is a pair of laterally spaced transport wheels 41. The wheels are individually suspended by trailing arms 42 sprung on torsion springs within cylindrical housings 43.

The outriggers 14 are comprised of a pair of beams 51 telescoped within tubes 52 of rectangular cross section. The tubes 52 are each pivotal on vertical hinge pins 53 anchored in the turntable base 21. The outboard or free ends of the outrigger beams 51 are fitted with hand wheel-operated leveling screws or jacks 54. Since the tubes 52 are limited to pivotal movement on the pins 53 in a horizontal plane parallel to the ground, movement of the beams 51 supported thereby is also limited to movement in this horizontal plane. As indicated in FIG. 8, the stabilizer or outrigger beams 51 are retractable through the tubes 52 into the tongue frame 11 wherein the tubes 52 are in parallel alignment with the tongue frame.

The angular position of the table 22 is interlocked with the angular position of the outriggers 14 by cams 56 and 57. The central cam 56 is fixed to the king pin 24, while the other cams 57 are integrally formed with the outrigger guide tubes 52. The angular position of the cam 56 illustrated in FIG. 8 corresponds with the parallel alignment of the mast 13, with the tongue frame or base 11, i.e., with the mast, and therefore its center of gravity, overlying the frame. Inspection of FIG. 8 reveals that the table 22 cannot be rotated from this rest position until the outrigger tubes 52 are substantially counter-rotated laterally outwardly through an angle of approximately 45 degrees each from the in-line position of this view. It will be understood that the outrigger beams 51 are fully extended out of the tongue frame 11 before they can be deployed to their laterally spaced position illustrated in FIG. 2. Further, the cam 56 associatted with the table 22 is arranged to prevent return of the outriggers 14 from the laterally spaced positioned of FIG. 2 to the retracted position of FIG. 8 whenever the mast 13 is out of its rest position over the tongue frame such that either a major circular portion 58 or a minor circular portion 59 interferes with edge areas 60 of the cams 57.

Figure 3:
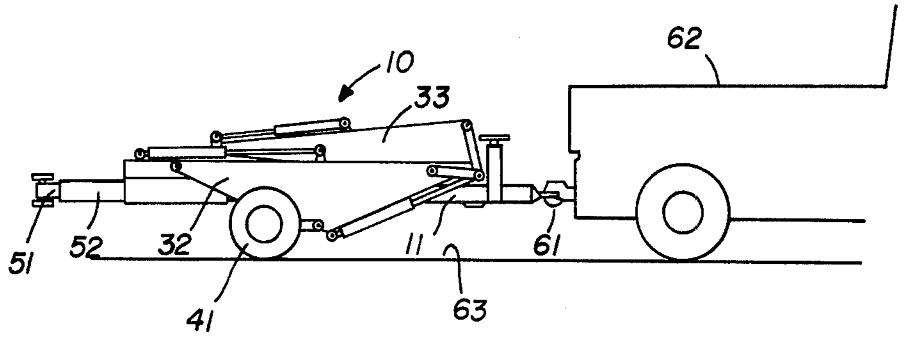
FIG. 3 is a side view in somewhat simplified form of the crane in a fully retracted condition and hitched to a tow vehicle.
Figure 4:
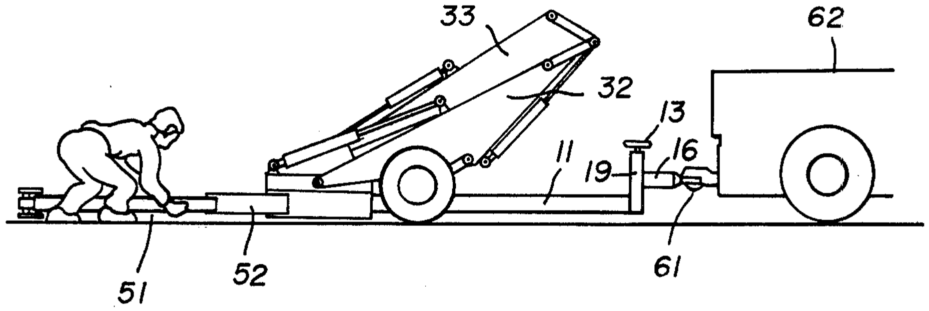
FIG. 4 is a view similar to FIG. 3, illustrating the crane in an intermediate erection position.

FIGS. 3 and 7 illustrate the mobile crane in its transport and storage configuration. The eyelet hitch 17 is mated with a coupling 61 on the rear of a suitable tow vehicle 62 such as a conventional pickup truck. In this configuration, the associated tongue extension 16 is coplanar with the tongue frame 11, and the primary or first beam stage 32 straddles or nests over the tongue frame, causing the transport wheels to be engaged with the ground at 63 and the tongue frame to be substantially elevated for adequate road clearance. In this position, the main beam as defined by a line between its end pivot points 31 and 36 is generally parallel to the tongue frame 11. The third beam stage 34 is folded upon or nested in the second beam stage 33 and both of these stages are folded or nested into the first stage 32. A releasable latch (not shown) is provided on the tongue frame 11 where the beam pivot point 36 lies in the retracted trailering position to lock this area of the mast to the tongue frame during transit.

The crane 10 is trailered in this configuration between job sites. With the crane 10 positioned in a desired location, it is erected by first lowering the tongue frame 11 relative to the extension 16 by operation of the hand wheel 18. The actuators **32*d* associated with the main beam 32 are operated to partially raise the main beam, and therefore the wheels 41, relative to the tongue frame 11, thereby lowering the latter adjacent to the ground. At this point, illustrated in FIG. 5, the outriggers 14 are deployed by first pulling the outrigger beams 51 from within the tongue frame 11 and then turning them laterally. The main beam 32 is further raised to lower the tongue frame into contact with the ground and the leveling jacks 54** are manually adjusted to suit the local terrain.

In the illustrated embodiment, the beam actuators **32*d*, 33*d*, and 34*d* are hydraulically operated, double-acting piston and cylinder units of conventional construction. These actuators 32*d*, 33*d*, and 34*d* are selectively operated by individual control valves schematically illustrated in FIG. 6 at 32*e*, 33*e*, and 34*e*. The pair of actuators 32*d*, 33*d*, and 34*d* of each beam are connected in parallel to their respective control valves by suitable hydraulic control lines. Pressurized fluid for these actuators is developed either with a manual pump or a power-driven hydraulic pump. Alternative to the use of the individual valves 32*e*, 33*e*, and 34*e*, the actuators 32*d*, 33*d*, and 34*d*** may be operated by a control circuit disclosed in U.S. patent application Ser. No. 756,915, filed Jan. 5, 1977, and assigned to the assignee of this invention.

The second and third beam stages 33 and 34 are arranged to pivot on their respective pivot points 36 and 37 through an angle of substantially 180 degrees from their nested positions when full extension of the mast, indicated in phantom in FIG. 1, is desired. This 180-degree motion is developed by a set of pivotal links 72,73 and 74,75 on which the actuators **33*d* and 34*d* are operative. FIG. 5 indicates by broken arcuate lines the kinematics of the several beams 32 through 34. In addition to the pivotal movement in the vertical plane of the beams 32 and 34, the mast 13 is capable of rotating in azimuthal movement through 360 degrees about the vertical axis 23 of the king pin 24. A hand wheel 67 (FIGS. 6 and 7) driving a gear box (not shown) mounted on a plate 68 fixed relative to the turntable base 22 is connected by a suitable sprocket and chain drive or other means to the table 22 to provide for manual rotation of the table, and therefore the mast, about the axis 23**.

Work is performed by the mast 13 in a number of ways including connecting a load to the outboard or free end, designated 69, of the outermost beam 34 (FIG. 1), through a chain or cable, and moving the load by manipulating the mast. Additionally, a load may be moved by providing a manually operated hoist 71 on this free end, or by stringing a cable (not shown) along the various beams 32, 33, and 34, from a power-operated winch on the fixed plate 68 to and over the free mast end 69 in an appropriate manner.

As indicated in FIG. 5, the extended length of the mast 13 is substantially longer than the combined length of the tongue frame 11 and hitch extension 16, for example, approximately twice as long as the tongue frame and extension length. As a result, even through the mast is pivoted adjacent the trailing end of the tongue frame 11, the mast is capable of extending forwardly well beyond the hitch 17 so as to enable the mast to load or unload a vehicle by which it is towed. It will be understood that the turntable assembly 12 and mast 13 during such loading and unloading of a tow vehicle is ordinarily turned 180 degrees about the turntable axis 23 from the orientation illustrated in FIG. 5. The multiple articulation of the mast 13 at the several pivot points 31, 36, and 37 combined with separate actuation for each beam provides ease in modifying the mast configuration for maximum vertical or horizontal extension, or to provide a folded or right angle configuration enabling it to clear a structure lying between it and the work to be lifted. Additionally, the multiple articulation of the mast in which the outer stages 33 and 34 are adapted to fold in upon the preceding stages 32 and 33 provides a unit which is both compact and low in its center of gravity for ideal trailing and storage conditions. Where the tow vehicle 62 remains coupled to the crane during operations, the outriggers 14 may each be extended 90 degrees from the longitudinal direction of the tongue frame 11 for maximum lateral stability while the tow vehicle provides ballast.

Although a preferred embodiment of the invention is illustrated, it is to be understood that various modifications and rearrangements of parts may be resorted to without departing from the scope of the invention disclosed and claimed therein.

What is claimed is:

1. A mobile crane comprising a generally horizontal base having at one end coupling means for engagement with a vehicle, a mast carried on said crane base, means for pivotally supporting said mast on said crane base for movement of a free end thereof in a vertical plane between a retracted position and an extended position, actuator means operably connected between said crane base and said mast for controllably raising and lowering said mast relative to said crane base, and a pair of transport wheels mounted on said mast between the ends thereof, said wheels being arranged on said mast in a manner permitting said wheels to engage the ground and raise the crane base for road clearance upon retraction of said mast, and alternatively lower the crane base for stabilization with the ground upon extension of said mast, said actuator means being constructed and arranged with respect to said mast to permit a load attached to said free end to be raised or lowered by operation of said actuator means.

2. A mobile crane as set forth in claim 1, wherein said wheels are arranged on said mast to completely disengage the ground when said mast is at least partially extended.

3. A mobile crane as set forth in claim 1, wherein said mast comprises a plurality of articulated beams.

4. A mobile crane as set forth in claim 3, including means for pivotally fixing one end of a first of said beams to said crane base, with the other end being free for pivotal movement relative to said crane base, said transport wheels being carried on said first beam.

5. A mobile crane as set forth in claim 3, wherein a second and any other subsequent beam has one end supported on the free end of a preceding beam and an opposite end forming a free end.

6. A mobile crane as set forth in claim 5, wherein said actuator means and said first and subsequent beams are constructed and arranged to cause said first and subsequent beams to pivot about parallel pivot axes from respective retracted positions to extended positions each through rotation in the same relative angular direction.

7. A mobile crane as set forth in claim 6, wherein one of the beams is constructed and arranged to pivot through an angle of substantially 180 degrees from a retracted position generally alongside and parallel to the preceding beam to an extended position generally parallel to the preceding beam.

8. A mobile crane as set forth in claim 7, wherein said transport wheels are carried on said first beam.

9. A mobile crane as set forth in claim 8, wherein said transport wheels are mounted laterally outboard of said first beam and said crane base.

10. A mobile crane as set forth in claim 9, wherein said first beam is pivotally mounted on said crane base for selective rotation about a horizontal axis and a vertical axis.

11. A mobile crane comprising a generally horizontal tongue frame unit having at one end coupling means for engagement with a tow vehicle, a mast unit carried on said tongue frame unit, means for pivotally supporting one end of said mast unit on the end of said tongue frame unit opposite said coupling means, said mast unit being constructed and arranged to lie substantially alongside said tongue frame unit in parallel alignment therewith so as to extend between said pivot supporting means and said coupling means when in a retracted position and to extend in a generally vertical direction when in an extended position, actuator means operably connected between said tongue frame unit and said mast to selectively extend and retract said mast unit and elevate a load when extended and to lower a load when retracted and transport wheels mounted on said mast between the ends thereof unit in a manner such that when said mast unit is in its retracted position said tongue frame unit is supported through said mast unit at a height for suitable road clearance by said wheels in engagement with the ground and when said mast unit is at least partially extended by operation of said actuator means said wheels are disengaged from the ground and said tongue frame unit is lowered for stabilization with the ground.

12. A mobile crane as set forth in claim 11, wherein said mast unit comprises a plurality of articulated beams, a first beam being supported at one end by said pivot supporting means, and at least one successive beam being pivotally supported at one end thereof to a free end of its preceding beam and at the opposite free end thereof pivotally supporting any succeeding beam.

13. A mobile crane as set forth in claim 12, wherein said mast unit in an extended position is substantially longer than said tongue frame unit, and a turntable at said opposite tongue frame end supporting said mast unit on said tongue frame unit for azimuthal movement.

14. A mobile crane as set forth in claim 12, wherein said first beam is constructed and arranged to nest with said tongue frame unit when it is in a retracted position.

15. A mobile crane as set forth in claim 14, wherein said first beam includes laterally spaced portions adapted to straddle said tongue frame unit when in said retracted position.

16. A mobile crane as set forth in claim 15, wherein said transport wheels are carried by said laterally spaced portions.

17. A mobile crane as set forth in claim 16, wherein said successive beams are arranged to nest with said first beam when in their respective retracted positions.

18. A mobile crane as set forth in claim 17, wherein said successive nesting beams in their retracted positions are disposed on a side of said first beam opposite the side of the first beam in confronting relation to said tongue frame unit when said first beam is in its retracted position.

* * * * *